United States Patent
Fox et al.

(10) Patent No.: US 8,264,315 B2
(45) Date of Patent: Sep. 11, 2012

(54) LINEAR VARIABLE DIFFERENTIAL TRANSFORMERS

(75) Inventors: Richard Fox, Mesa, AZ (US); Gene Holden, Scottsdale, AZ (US); Robert Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 123 days.

(21) Appl. No.: 12/849,659

(22) Filed: Aug. 3, 2010

(65) Prior Publication Data

US 2012/0032768 A1   Feb. 9, 2012

(51) Int. Cl.
*H01F 21/06* (2006.01)
(52) U.S. Cl. .......................................... 336/130
(58) Field of Classification Search .............. 336/130, 336/136, 137, 142, 116–118, 121, 129, 212, 336/233, 234
See application file for complete search history.

(56) References Cited

U.S. PATENT DOCUMENTS

| | | | |
|---|---|---|---|
| 3,844,173 A | 10/1974 | Rockstead et al. | |
| 4,505,158 A | 3/1985 | Maples | |
| 4,667,158 A * | 5/1987 | Redlich | 324/207.19 |
| 4,991,301 A * | 2/1991 | Hore | 33/366.25 |
| 5,004,391 A * | 4/1991 | Burdea | 414/6 |
| 7,271,582 B2 | 9/2007 | Proksch et al. | |

OTHER PUBLICATIONS

Penny + Giles, A Curtis-Wright Company "LDVT Displacement Transducers, Innovation in Motion," 2005, 12 pages.
Repas, Robert, MachineDesign.com, "New Uses for Linear Variable Differential Transformers (LVDTs)," Feb. 3, 2010, retrieved from the Internet at http://machinedesign.com/article/new-uses-for-linear-variable-differential-transformers-lvdts-0203 on Apr. 20, 2010.
WWW.SCHAEVITZ.COM, Schaevitz LVDT Technology, LVDT Functional Advantages and Operation Principles, pp. 18-21, undated.
Yang, Y.P. et al. "New Techniques for the Non-Contact Measurement of Displacer Motion of a Miniature Split-Stirling Cryocooler," 1996 Elsevier Science Limited, 1996, vol. 36, No. 8, pp. 573-578.

\* cited by examiner

*Primary Examiner* — Tuyen Nguyen
(74) *Attorney, Agent, or Firm* — Ingrassia Fisher & Lorenz, P.C.

(57) ABSTRACT

Linear variable differential transformers include a core comprising a non-ferromagnetic material and a ferromagnetic material, and a coil assembly including an axial bore within which the core is disposed and through which the core axially translates.

9 Claims, 4 Drawing Sheets

LINEAR VARIABLE DIFFERENTIAL TRANSFORMERS

TECHNICAL FIELD

The inventive subject matter generally relates to transformers, and more particularly relates to linear variable differential transformers.

BACKGROUND

Gas turbine engines typically have fuel supply systems for delivering fuel to a combustor, where the fuel is ignited to produce a thrust. In many engines, the fuel is stored in a fuel source, such as a fuel tank, and is drawn out by one or more pumps. The pumps pressurize the fuel and deliver the pressurized fuel to manifolds in the combustor via a main supply line. To control the rate at which the fuel flows through the system, the main supply line may include one or more valves in flow series between the pumps and the fuel manifolds. These valves generally include at least a main metering valve and a bypass valve. The bypass valve may be disposed in a bypass flow line connected upstream of the metering valve for allowing a portion of the fuel flowing in the main supply line back to the inlet of the one or more pumps.

During operation, a flow rate across the main metering valve is determined in order to establish whether the bypass valve should be used or whether to change the flow rate of the fuel through the system. In this regard, a position sensor is coupled to the main metering valve. The position sensor can be a linear variable differential transformer and can include a core surrounded by primary and secondary windings. The core is typically coupled to the main metering valve and moves linearly through the primary and secondary windings. When the flow rate across the main metering valve changes, the core changes position relative to the primary and secondary windings and the change in position is then communicated to a controller. The controller determines whether to send a signal to increase or decrease the flow rate across the main metering valve.

Although the aforementioned linear variable differential transformers are adequate for use in conventional engines, they may be improved. For example, in some engines, the linear variable differential transformer components are exposed to a harsh environment in front or around the engine and may be more susceptible to corrosion. Additionally, as engine power output demands increase and engine operating temperatures increase, the linear variable differential transformer is subjected to high-temperature air around the LVDT (e.g., environmental temperatures up to 500° C.). The high-temperature environment may decrease the winding and termination reliability of the linear variable differential transformers causing frequent need for replacement and increase in maintenance costs of the engine. In addition high temperature introduces measurement error that must be accounted for through component design and/or signal conditioning.

Accordingly, it is desirable to have an improved linear variable differential transformer that may be more corrosion-resistant than conventional linear variable differential transformers. In addition, it is desirable to have a linear variable differential transformer that can be employed in environments that may be subjected to environmental temperatures up to 500° C. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Linear variable differential transformers are provided.

In an embodiment, by way of example only, a core comprising a non-ferromagnetic material and a ferromagnetic material, and a coil assembly including an axial bore within which the core is disposed and through which the core axially translates.

In another embodiment, by way of example only, a housing, a primary coil, a secondary coil, and a core. The housing includes an axial bore. The primary coil is disposed in the housing. The secondary coil is disposed in the housing and includes a first winding and a second winding, the first winding and the second winding disposed at least adjacent to opposing ends of the primary coil. The core is disposed within and is configured to axially translate through the axial bore of the housing. The core includes a main body and an outer sleeve and comprises a material selected from a group consisting of a non-ferromagnetic material and a ferromagnetic material. The outer sleeve is disposed around the main body and comprises the material not selected for the main body.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved linear variable differential transformer has been provided that can be employed in a wide range of temperature environments, such as in temperatures of between about −60° C. to about 500° C. The linear variable differential transformer includes a core comprising two different materials, where one material is a magnetic material and the other material is a non-magnetic material.

Figure 1:
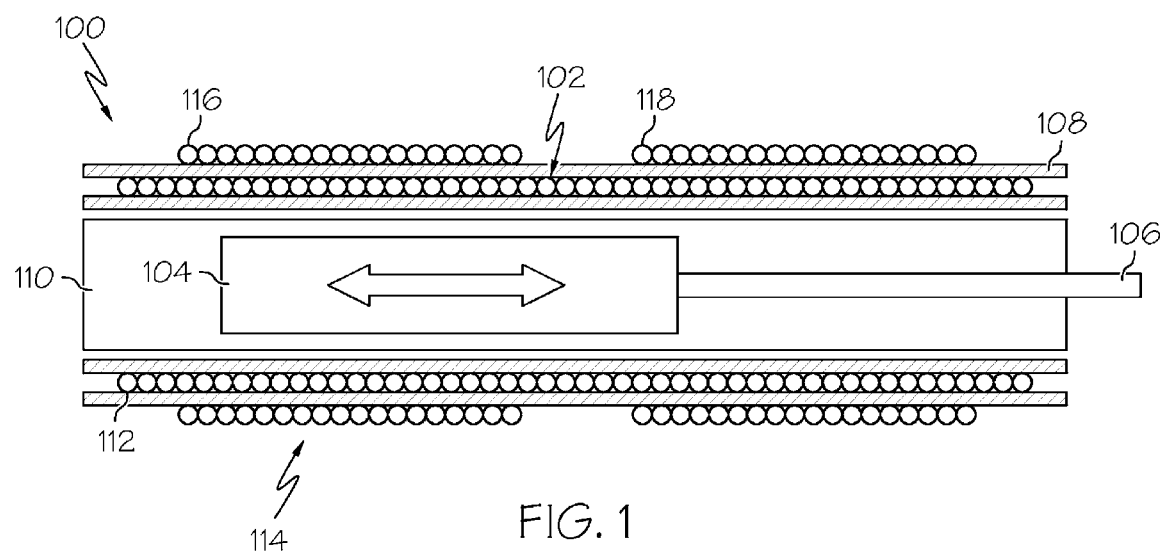
FIG. 1 is a cross-sectional view of a simplified linear variable differential transformer, according to an embodiment.

FIG. 1 is a cross-sectional view of a simplified linear variable differential transformer (LVDT) 100, according to an embodiment. The LVDT 100 includes a coil assembly 102 and a core 104 affixed to a rod 106. The coil assembly 102 is disposed in a housing 108 and includes a central or primary coil 112 disposed between two windings 116, 118 making up a secondary coil 114. The housing 108 includes an axial bore 110 configured to allow the core 106 to axially translate therethrough in response to movement of the rod 106. The primary coil 112 are wound around an inner portion of housing 108, and the first and second windings 116, 118 of the secondary coil 114 are wound around an outer portion of housing 108. Each of the coils 112, 114 can be formed from insulated conductive wires. In an embodiment, the primary coil 112 comprises a 350-turn coil including a single layer of wound wire, and each of the first and second windings 116, 118 of the secondary coil 114 comprises a 125-turn coil including three layers of wound wire. In an embodiment, the first and second windings 116, 118 of the secondary coil 114 may generally circumscribe substantially opposing end portions of the primary coil 112. An insulative body (not shown) (e.g., dielectric insulating materials) may be disposed between secondary windings 116, 118 and primary coil 112. In other embodiments, the first and second windings 116, 118 do not circumscribe the primary coil 112 and instead are disposed one each at the ends of the primary coil 112. Although a single coil assembly is included, more than one coil assembly may be employed where each coil assembly has a primary and secondary coil.

As noted above, the core 104 moves relative to the housing 108 in response to a change in position of the rod 106. The core 104 comprises material capable of causing a transfer of current between the primary winding 116 and the secondary windings 118. Hence, during operation, voltages ($V_a$ and $V_b$) are induced in the first and second windings 116, 118, respectively. The core 104 is further configured such that a predetermined difference/sum ratio having a value in a range of about typically 0±0.5 is maintained at all times during operation of the LVDT 100.

As used herein, the term "difference/sum ratio" is defined by the following equation:

$$V_a - V_b / V_a + V_b$$

where $V_a$ is a voltage induced in a first winding of a secondary coil of an LVDT and $V_b$ is a voltage induced in a second winding of the secondary coil of the LVDT. To maintain the predetermined difference/sum ratio, the core 104 includes one or more sections comprising a ferromagnetic material and one or more sections comprising a non-ferromagnetic material, where the sections distribute magnetic properties linearly or circumferentially along the core 104. The particular dimensions and configurations of each section of the core 104 can depend on the particular magnetic permeability of the materials chosen.

Figure 2:
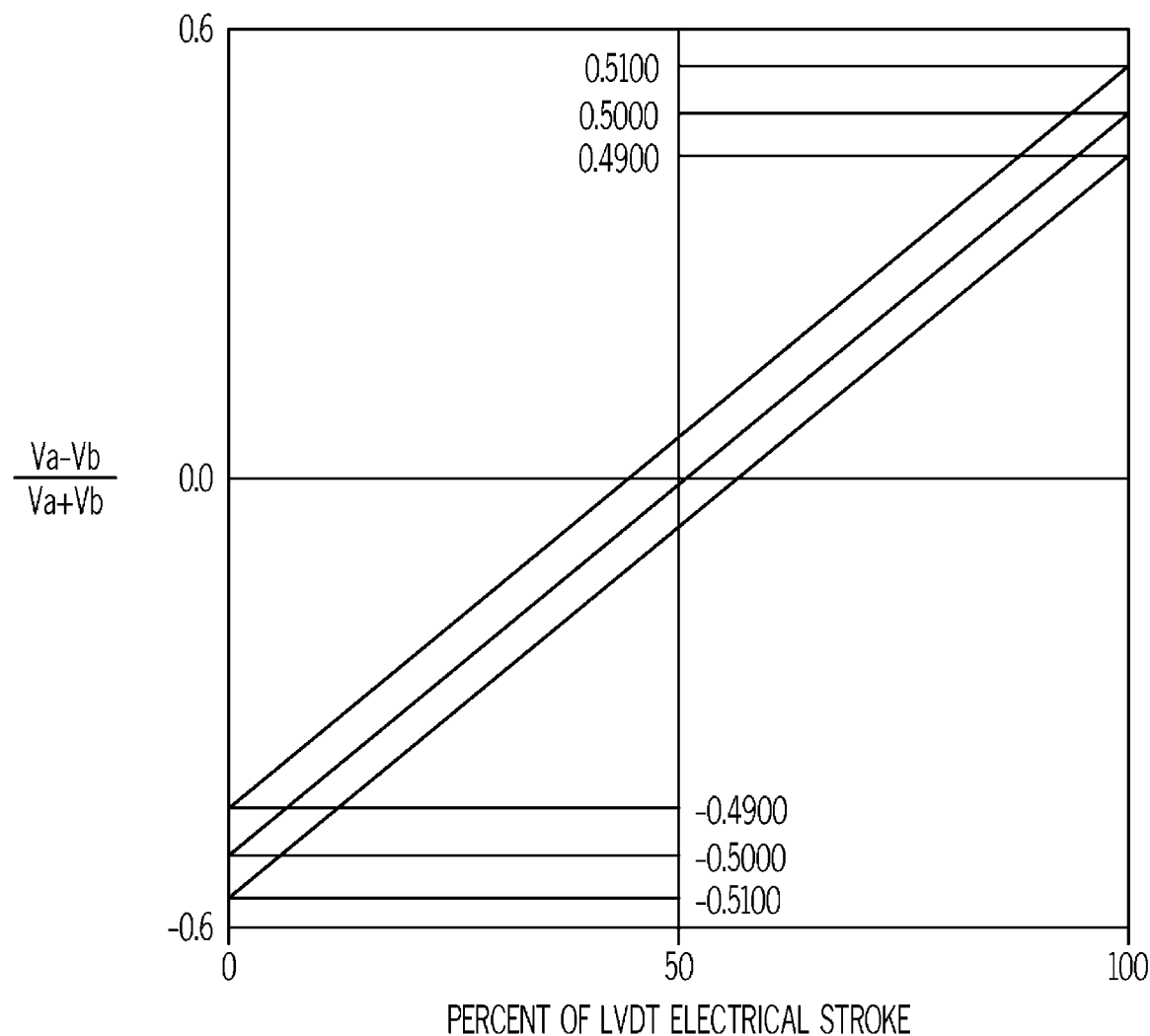
FIG. 2 is a graph of including a line plotting a difference/sum ratio along a Y-axis against a percent of LVDT electrical stroke along an X-axis, according to an embodiment.

When selecting the materials to be included in the core 104, a determination is made as to whether the selected combination and configuration of the materials can provide an output that corresponds to that of a conventional LVDT (e.g., an LVDT typically used in low temperature applications). FIG. 2 is a graph 100 including a line 102 plotting a difference/sum ratio along a Y-axis 104 against a percent of LVDT electrical stroke along an X-axis 106, according to an embodiment. The term "percent of LVDT electrical stroke" is a percent of a total length of the LVDT that the core is inserted into the bore of the housing 108. By referring to the graph 100, the LVDT can be designed to maintain a desired difference/sum ratio when the core moves within the bore a value that is located along line 102. Thus, when selecting materials that are capable of withstanding elevated operating temperatures (e.g., 200° C. to 540° C.) and adjusting the particular amount and/or configuration of the combination of materials for the core 104, the LVDT can be designed to operate in a manner similar to conventional LVDTs. Additionally, by maintaining the output of the improved LVDT similar or substantially equal to that of the conventional LVDT, aircraft engine manufacturers can avoid requalifying an entirety of a aircraft digital electronic control system in which the improved LVDT is included.

Figure 3:
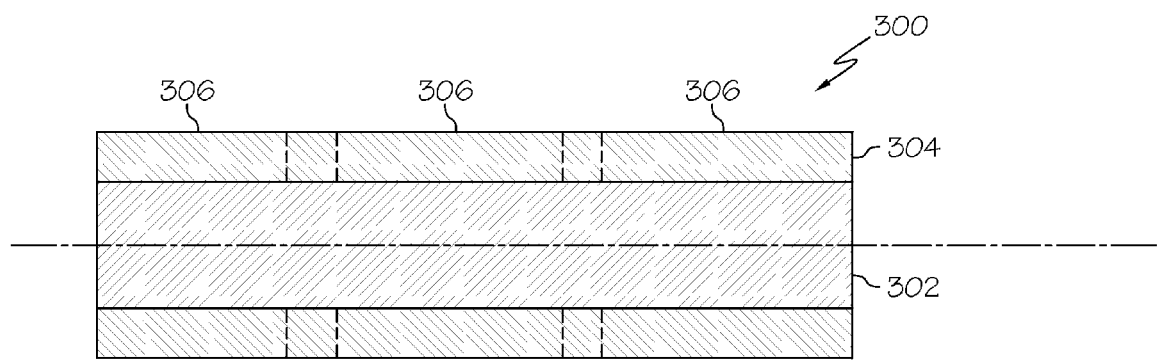
FIG. 3 is a cross-sectional view of a simplified core for use in a linear variable differential transformer, according to an embodiment.

FIG. 3 is a cross-sectional view of a simplified moveable core 300 for use in a linear variable differential transformer, such as LVDT 100, according to an embodiment. The moveable core 300 includes an elongated main body 302 and an outer sleeve 304. The main body 302 is a solid cylindrical component and comprises the non-ferromagnetic material, while the outer sleeve 304 surrounds the main body 302 and comprises the ferromagnetic material. Although the sleeve 304 is depicted as extending an entire axial length of the main body 302, the sleeve 304 can have a different configuration in other embodiments. For example, the sleeve 304 can extend partially along the axial length of the main body 302, such as from one end of the main body 302 to just short of an opposite end of the main body 302. In another embodiment, the sleeve 304 is disposed inside of the two ends of the main body 302. In still another embodiment, the sleeve 304 is not continuous along the length of the main body 302. Rather, the sleeve 304 may be disposed as a series of rings 306 (depicted in phantom) along the length of the main body 302.

Generally, the main body 302 is cylindrical and can have a length in a range of about 2 cm to about 16 cm and a diameter in a range of about 0.5 cm to about 3 cm. Depending on the particular ferromagnetic material selected for the outer sleeve 304, the outer sleeve 304 can have a thickness in a range of about 0.5 mm to about 5 mm. Thus, in configurations in which the ferromagnetic material has a higher magnitude of magnetic permeability, the outer sleeve 304 is thinner. In configurations in which the ferromagnetic material has a greater magnitude of magnetic permeability, the outer sleeve 304 is thicker. In an example, the outer sleeve 304 comprises a 400 series ferromagnetic stainless steel, and the main body 302 comprises a 300 series non-ferromagnetic stainless steel. In a preferred embodiment, the outer sleeve 304 comprises a corrosion resistant material or has a corrosion resistant coating disposed thereon. The corrosion resistant coating can be ferromagnetic or non-ferromagnetic. In such case, the main body 302 can have a radial cross-sectional area that is about 75% of the total radial cross-sectional area of the core 300 (e.g., the total radial cross-sectional area occupied by the main body 302 and the outer sleeve 304). In other embodiments, the radial cross-sectional areas of the main body 302 and outer sleeve 304 are selected to correspond to a predetermined signal conditioning circuitry slope (such as shown in FIG. 2).

Figure 4:
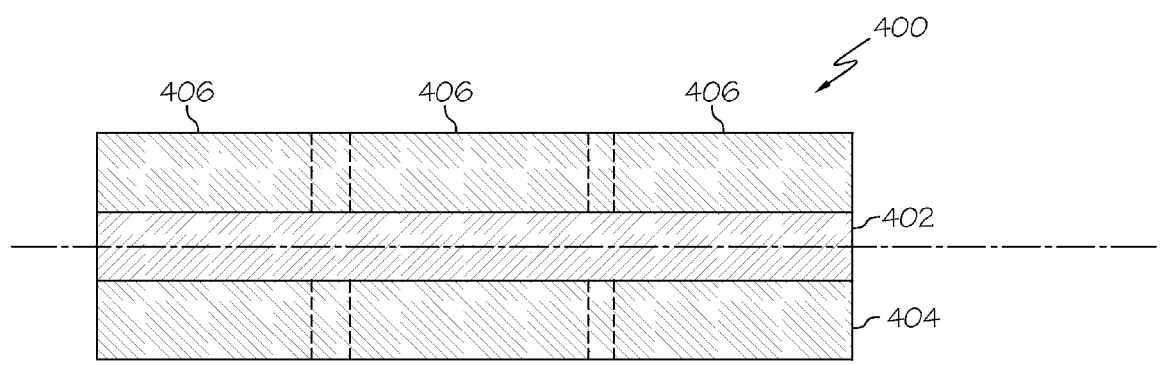
FIG. 4 is a cross-sectional view of a simplified core for use in a linear variable differential transformer, according to another embodiment.

FIG. 4 is a cross-sectional view of a simplified core 400 for use in a linear variable differential transformer, such as LVDT 100, according to another embodiment. Here, the core 400 includes an elongated main body 402 and an outer sleeve 404 formed substantially similar to main body 402 and outer sleeve 404 of FIG. 3, except that the main body 402 comprises the ferromagnetic material, while the outer sleeve 304 surrounding the main body 402 comprises the non-ferromagnetic material. Although the sleeve 404 is depicted as extending an entire axial length of the main body 402, the sleeve 404 can have a different configuration in other embodiments. For example, the sleeve 404 can extend partially along the axial length of the main body 402, such as from one end of the main body 402 to just short of an opposite end of the main body 402. In another embodiment, the sleeve 404 is disposed inside of the two ends of the main body 402. In still another embodiment, the sleeve 404 is not continuous along the length of the main body 402. Rather, the sleeve 404 may be disposed as a series of rings 406 (depicted in phantom) along the length of the main body 402. In such case, the rings can comprise a non-ferromagnetic material, such as copper. The copper, if employed may be disposed on an inner diameter surface of the rings or an oxidation-resistant coating may be disposed over the surfaces of the rings.

Depending on the particular ferromagnetic material selected for the main body 402, the main body 402 can be cylindrical having a length in a range of about 2 cm to about 15 cm and a diameter in a range of about 0.5 cm to about 3 cm. The outer sleeve 404 can have a thickness in a range of about 0.5 mm to about 5 mm. In configurations in which the ferromagnetic material has a higher magnitude of magnetic permeability, the main body 402 has a smaller radial cross-sectional area. In configurations in which the ferromagnetic material has a lower magnitude of magnetic permeability, the main body 402 may have a larger radial cross-sectional area. In an example, the outer sleeve 404 comprises 300 series Stainless steel, and the main body 402 comprises alternating cores of ferrite material, such as tool steel or magnetic iron and non-ferrous material such as 300 series stainless steel. In such case, the main body 402 can have a radial cross-sectional area that is about, but not limited to 75% of the total radial cross-sectional area occupied by the main body 402 and the outer sleeve 404.

Figure 5:
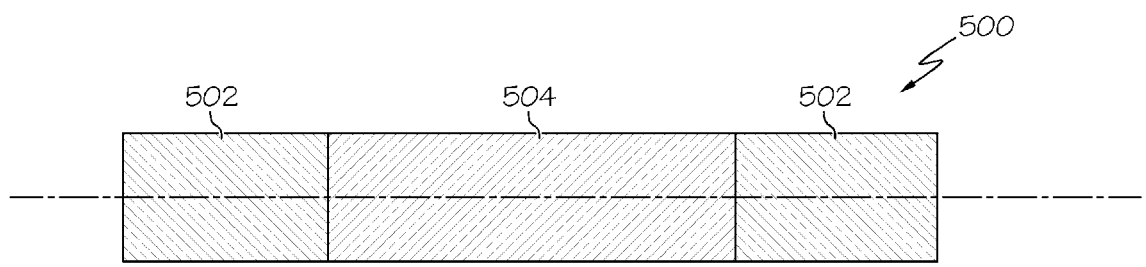
FIG. 5 is a cross-sectional view of a simplified core for use in a linear variable differential transformer, according to still another embodiment.

FIG. 5 is a cross-sectional view of a simplified core 500 for use in a linear variable differential transformer, such as LVDT 100 of FIG. 1, according to another embodiment. Here, the core 500 comprises a series of two or more joined segments 502, 504, where the joined segments comprise a non-ferromagnetic segment 502 adjacent to a ferromagnetic segment 504. The core 500 includes more non-ferromagnetic segments 502 than ferromagnetic segments 504. The total length of the core 500 is 2 cm. The ferromagnetic segments can have uniform or varied lengths in a range of about 0.25 cm to about 0.5 cm, and the non-ferromagnetic segments can have uniform or varied lengths in a range of about 0.25 cm to about 0.5 cm. Thus, each of the non-ferromagnetic segments has an axial length, and the ferromagnetic segment has an axial length that is equivalent or shorter than the axial length of each of the non-ferromagnetic segments, in an embodiment. It will be appreciated, however, that the particular lengths of each segment and the total number of each type of segment depend on the particular materials selected. The total length of the stack of ferromagnetic and non-ferromagnetic materials is equivalent to the length of one secondary coil, which in the current embodiment is about 4 cm.

Figure 6:
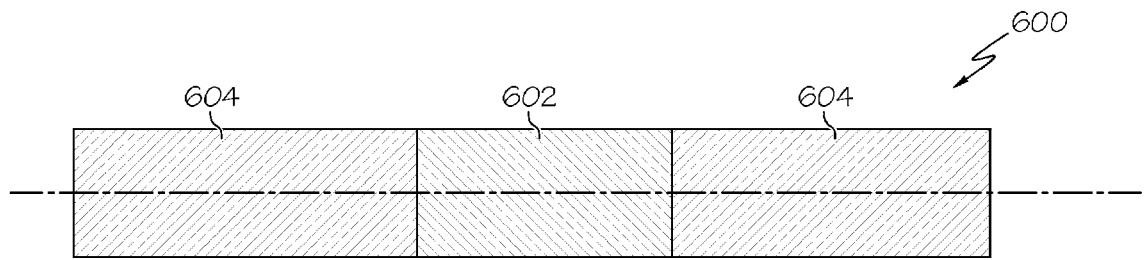
FIG. 6 is a cross-sectional view of a simplified core for use in a linear variable differential transformer, according to still another embodiment.

FIG. 6 is a cross-sectional view of a simplified core 600 for use in a linear variable differential transformer, such as LVDT 100 of FIG. 1, according to another embodiment. Here, the core 600 comprises a series of two or more joined segments 602, 604, where the joined segments comprise a non-ferromagnetic segment 602 adjacent to a ferromagnetic segment 604. The core 600 includes more ferromagnetic segments 604 than non-ferromagnetic segments 602. The total length of the core 600 is in a range of about 0.5 to about 15 cm. The ferromagnetic segments can have uniform or varied lengths in a range of about 0.25 cm to about 6 cm, and the non-ferromagnetic segments can have uniform or varied lengths in a range of about 0.25 cm to about 7.5 cm. Thus, each of the ferromagnetic segments has an axial length, and the non-ferromagnetic segment has an axial length that is equivalent or longer in length than the axial length of each of the ferromagnetic segments, in an embodiment. It will be appreciated, however, that the particular the lengths of each segment and the total number of each type of segment depend on the particular materials selected.

No matter the particular configuration of the core 104, suitable examples of ferromagnetic material, include, but are not limited to silver, ferrite, cobalt, silicon steel, a copper alloy, a nickel alloy, and an iron-alloy. Suitably non-ferromagnetic materials include, but are not limited to nickel, copper, 300 series stainless steel, or tool steels.

Returning now to FIG. 1, as noted above, the rod 106, which is fixedly coupled at one end 122 to a translating component such as a piston valve element (not shown), translates in response to movement of the translating component. As a result, the core 104 to slides axially within bore 110 (indicated in FIG. 1 by double-headed arrow 124). To detect a change in position of the core 106 within the bore 110, an alternating current is applied to the primary coil 112 (commonly referred to as the "primary excitation") and a differential AC voltage is induced in one or both of secondary windings 116, 118. The differential AC voltage between the windings 116, 118 of the secondary coil 114 varies in relation to the axial movement of the core 106 within the axial bore 110. During operation of LVDT 100, electronic circuitry (not shown) associated within LVDT 100 converts the AC output voltage to a suitable current (e.g., high level DC voltage) indicative of the translational position of core 106 within bore 110. The DC voltage may be monitored by a controller (also not shown) to determine the translation position of core 106 and, therefore, the translational position of the movable element (e.g., piston valve element) fixedly coupled to the rod 108.

By including a core (e.g., core 106, 300, 400, 500, 600) comprising both non-ferromagnetic material and ferromagnetic material in an LVDT, the LVDT can be employed in a wider range of environments as compared to LVDTs including conventionally-designed cores. Specifically, by selecting ferromagnetic and non-ferromagnetic materials that are more suitable for use in high temperature environments and/or or more resistant to corrosion and by coupling the selected materials together, LVDTs can be manufactured having substantially similar or improved responses as compared to conventional LVDTs.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A linear variable differential transformer, comprising:
   a core comprising a series of joined segments that comprises a first non-ferromagnetic segment, a second non-ferromagnetic segment, and a ferromagnetic segment disposed between the first and the second non-ferromagnetic segments; and
   a coil assembly including an axial bore within which the core is disposed and through which the core axially translates.

2. The transformer of claim 1, wherein:
the first non-ferromagnetic segment has a first axial length;
the second non-ferromagnetic segment has a second axial length; and
the ferromagnetic segment has a third axial length that is shorter than the first axial length and equal to or shorter than the second axial length.

3. The transformer of claim 1, wherein the non-ferromagnetic material comprises a material selected from a group consisting of copper, 300 series stainless steel, nickel, and a tool steel.

4. The transformer of claim 1, wherein the ferromagnetic material comprises a material selected from a group consisting of silver, ferrite, cobalt, silicon steel, a copper alloy, a nickel alloy, and an iron-alloy.

5. The transformer of claim 1, wherein the non-ferromagnetic material comprises a material selected from a group consisting of copper, 300 series stainless steel, nickel, and a tool steel.

6. The transformer of claim 1, wherein the ferromagnetic material comprises a material selected from a group consisting of silver, ferrite, cobalt, silicon steel, a copper alloy, a nickel alloy, and an iron-alloy.

7. A linear variable differential transformer, comprising:
a housing including an axial bore;
a primary coil disposed in the housing;
a secondary coil disposed in the housing and including a first winding and a second winding, the first winding and the second winding disposed at least adjacent to opposing ends of the primary coil; and
a core,
wherein the core has a difference/sum ratio in a range of 0±0.5, and
wherein the core comprises one of the following:
  a series of joined segments comprising a first non-ferromagnetic segment, a second non-ferromagnetic segment, and a ferromagnetic segment disposed between the first and the second non-ferromagnetic segments, or
  a series of joined segments comprising a first ferromagnetic segment, a second ferromagnetic segment, and a non-ferromagnetic segment disposed between the first and the second ferromagnetic segments.

8. A linear variable differential transformer, comprising:
a core comprising a series of joined segments comprising a first ferromagnetic segment, a second ferromagnetic segment, and a non-ferromagnetic segment disposed between the first and the second ferromagnetic segments; and
a coil assembly including an axial bore within which the core is disposed and through which the core axially translates.

9. The transformer of claim 8, wherein:
the first non-ferromagnetic segment has a first axial length;
the second non-ferromagnetic segment has a second axial length; and
the ferromagnetic segment has a third axial length that is equal to the first axial length and shorter than the second axial length.

* * * * *